June 16, 1959  H. N. HATCHETT  2,890,596
MOTOR VEHICLE SPEED SETTING DEVICE
Filed April 8, 1958  2 Sheets-Sheet 1
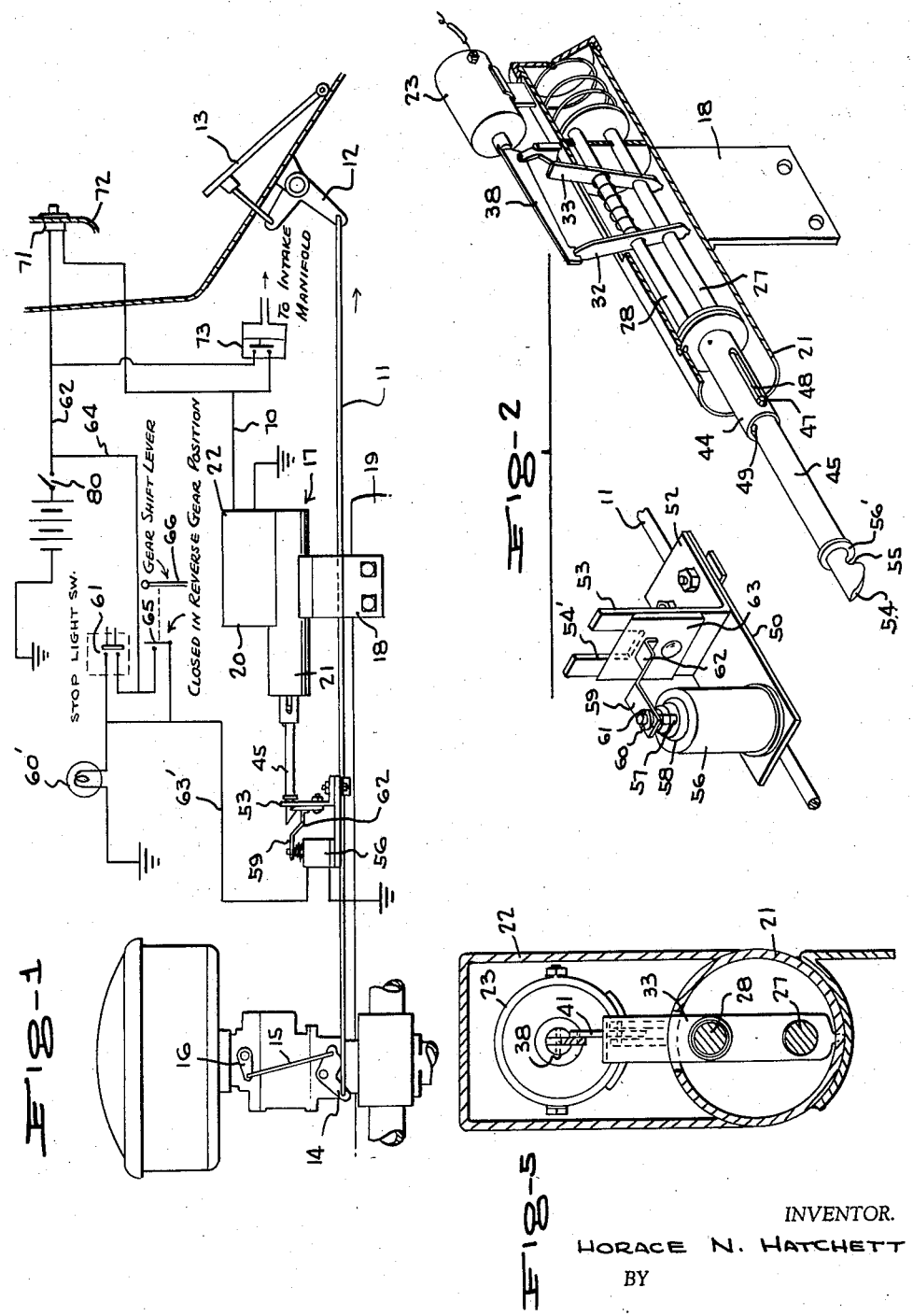
INVENTOR.
HORACE N. HATCHETT
BY
McMorrow, Berman + Davidson
ATTORNEYS June 16, 1959  H. N. HATCHETT  2,890,596
MOTOR VEHICLE SPEED SETTING DEVICE
Filed April 8, 1958  2 Sheets-Sheet 2
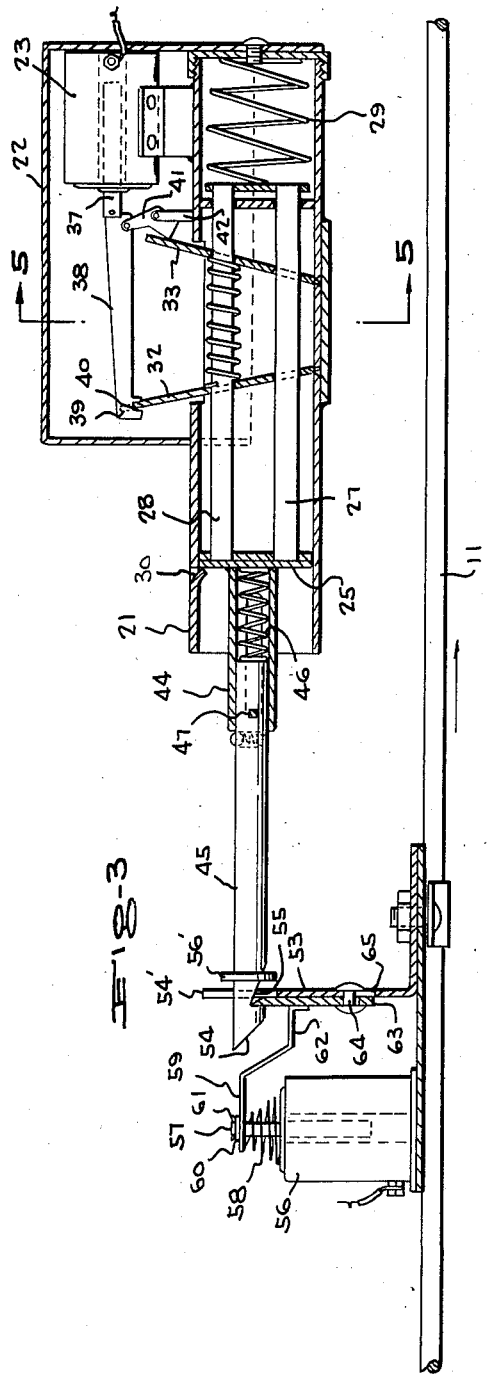
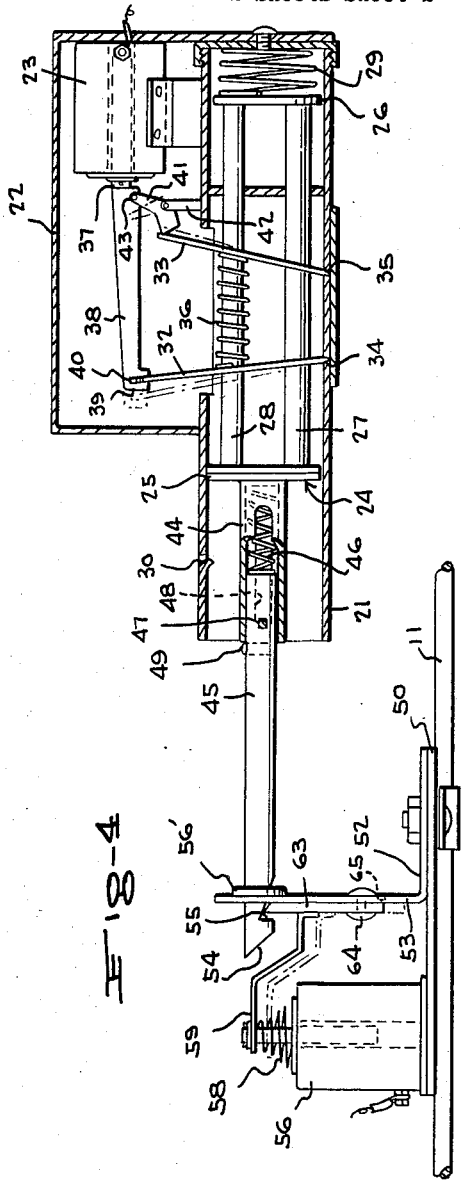
INVENTOR.
HORACE N. HATCHETT
BY
McMorrow, Berman + Davidson
ATTORNEYS United States Patent Office 2,890,596
Patented June 16, 1959

2,890,596

MOTOR VEHICLE SPEED SETTING DEVICE

Horace N. Hatchett, Chicago, Ill.

Application April 8, 1958, Serial No. 727,217

5 Claims. (Cl. 74—531)

This invention relates to motor vehicles, and more particularly to a device to maintain the accelerator linkage of a motor vehicle at a desired position.

The main object of the invention is to provide a novel and improved device for maintaining the accelerator linkage of a motor vehicle at a position corresponding to a desired speed, said device being simple in construction, being easy to install, and involving relatively inexpensive components.

A further object of the invention is to provide an improved device for maintaining the accelerator rod of a motor vehicle in a position corresponding to a desired vehicle speed, the device involving relatively few parts, being reliable in operation, being easy to adjust, and releasing automatically when the vehicle brakes are applied or when the vehicle transmission is placed in reverse position.

A still further object of the invention is to provide an improved device for maintaining the accelerator rod of a motor vehicle in a desired position corresponding to a desired vehicle speed, said device being arranged so that the vehicle may be operated at a speed above said desired speed and being further arranged so that the adjustment is automatically canceled when the vehicle is parked and may be otherwise canceled manually at any desired time by the vehicle operator.

Further objects and advantages of the invention will become apparent from the following description and claims, from the accompanying drawings, wherein:

Figure 1 is a fragmentary vertical cross sectional view taken through a portion of a motor vehicle provided with an improved speed-maintaining device according to the present invention, and illustrating the electrical connections involved.

Figure 2 is a perspective view, partly in cross section, of the catch means and detent means employed in the device of Figure 1.

Figure 3 is an enlarged longitudinal vertical cross sectional view taken through the detent means and catch means employed in the device of Figure 1, illustrating a portion of the accelerator rod on which the catch means is mounted.

Figure 4 is a vertical cross sectional view, similar to Figure 3, but showing the detent means in released position so that it can be set to automatically lockingly engage with the catch means at a desired predetermined position of the accelerator rod.

Figure 5 is an enlarged transverse vertical cross sectional view taken on the line 5—5 of Figure 3.

Referring to the drawings, 11 designates the accelerator rod of a motor vehicle, the accelerator rod being connected between a bell crank lever 12 operated by the accelerator pedal 13 and another bell crank lever 14 which is connected by a link rod 15 to the throttle lever 16 of the vehicle.

As will be apparent from Figure 1, when the accelerator pedal 13 is depressed, the bell crank lever 12 is rotated in a counter-clockwise direction, as viewed in Figure 1, and the accelerator rod 11 is moved to the right.

Designated generally at 17 is a detent assembly which is mounted, as by a suitable bracket 18 on the vehicle engine 19 adjacent to the accelerator rod 11. The detent assembly 17 comprises a housing 20 having a generally cylindrical portion 21 disposed parallel to the rod 11 and having an upstanding portion 22 in which is mounted an electromagnet 23. Slidably mounted in the cylindrical portion 21 is a piston 24 comprising respective disc members 25 and 26 rigidly connected by a pair of vertically spaced parallel rods 27 and 28, the forward disc member 25 being slidable in the cylindrical housing portion 21, and the rear disc member 26 engaging a coiled spring 29 which biases the piston 24 to the left, as viewed in Figure 4. An inturned stop lug 30 is formed in the end portion of the cylinder 21 opposite the coiled spring 29, the lug 30 at times cooperating with the disc portion 25 to limit movement of the piston assembly 24 to the left, as viewed in Figure 4.

Designated at 32 and 33 are respective locking bars which are loosely engaged on the parallel rods 27 and 28 and which pivotally engage in openings 34 and 35 provided in the bottom wall portion of cylinder 21, as is clearly shown in Figure 4. A coiled spring 36 is provided on the upper rod 28, said spring bearing between the locking bars 32 and 33, biasing said bars outwardly, whereby the bars frictionally and lockingly engage with the rods 27 and 28 to lock the piston 24 in a substantially fixed position in the cylinder 21.

The electromagnet 23 is provided with a plunger 37, said plunger having an arm 38 secured to its end and projecting therefrom, said arm being formed with a downwardly facing notched end lug 39 which pivotally interengages with the top portion of the locking bar 32, said top portion being formed with a notch 40 interengaging with the notch in the lug 39, as shown in Figure 4. A bell crank lever 41 is pivoted to an upstanding lug 42 provided on the top wall of the cylinder 21, said bell crank lever being pivotally connected at one end to the arm 38, as shown at 43, and engaging the top portion of the locking bar 33 at its other end. As will be readily apparent from Figure 4, when the electromagnet 23 is energized to retract its plunger 37, the arm 38 is moved to the right, as viewed in Figure 3, causing the locking bar 32 to be rotated in a clockwise direction and the locking bar 33 to be rotated in a counter-clockwise direction, namely, to the releasing positions shown in Figure 4, whereby the rods 27 and 28 are released, and whereby the piston 24 may be moved axially in the cylinder 21, as will be presently described.

The disc assembly 25 is formed with a sleeve member 44 which projects axially toward the open end of the cylinder 21 and in which is slidably engaged a catch rod 45. The catch rod 45 is biased outwardly by a coiled spring 46 disposed in the sleeve 44, as shown in Figures 3 and 4, acting to urge the catch rod 45 to the left. A stop pin 47 is secured to the catch rod 45 and projects through a longitudinal slot 48 formed in the sleeve 44, limiting the extension of the catch rod 45 from the sleeve.

The catch rod 45 is provided with a ball detent 49 which projects outwardly therefrom and which normally limits the inward movement of the catch rod into the sleeve 44. However, if sufficient force is exerted on the catch rod 45, urging the catch rod inwardly relative to the sleeve member, the detent 49 yields, allowing the catch rod to be forced into the sleeve member.

Designated at 50 is a generally rectangular bracket plate which is clampingly secured to the accelerator rod 11 forwardly adjacent the detent assembly 17, and normally located a short distance ahead of the rod 45. An angled bracket 52 is secured on the plate 50, said bracket 52 being formed with the upstanding flange 53 and said flange being formed with the rectangular notch 54' in its top end. Notch 54' is aligned with the rod 45 so that the rod 45 passes through the notch when the accelerator rod 11 is moved to the right, as viewed in Figure 1. The end of the rod 45 is beveled, as shown at 54 and the portion adjacent thereto is formed with a triangular notch 55 which faces downwardly. Secured on the rod rearwardly adjacent the notch 55 is a washer 56' which is substantially larger in diameter than the width of the notch 54', whereby the washer 56' will be abutted by the flange 53 when the accelerator rod 11 is moved to the right.

Mounted on the plate 50 is an electromagnet 56 having a vertically movable plunger 57, said plunger being retracted downwardly responsive to the energization of the electromagnet 56 and being biased upwardly by a coiled spring 58 which surrounds the plunger and which bears against an arm 59 receiving the top end of the plunger 57. The upward force exerted by the spring 58 is transmitted through the arm 59 to a washer 60 retained on the top end portion of the plunger 57 by a cotter pin 61, as shown in Figure 2.

Arm 59 is formed with a downwardly offset end portion 62 which is secured to a vertical catch plate 63 slidably engaged with the flange 53 and guided for vertical movement by a connecting rivet 64 extending through the plate 63 and through a vertical slot 65 formed in the upstanding flange 53 below the notch 54'. As will be readily apparent, the plate 63 is biased upwardly by the coiled spring 58 and is supported thereby in a position to be engaged by the beveled end 54 of the detent element 45, being yieldable sufficiently to allow the beveled end portion of element 45 to pass over the top edge of plate 63, whereby the plate will be lockingly received in the notch 55 in element 45.

When the notch 55 has been lockingly engaged with the plate 63, the accelerator rod 11 is substantially locked and will be retained in a substantially fixed position until the plate 63 is retracted, which occurs when the electromagnet 56 is energized.

As shown in Figure 1, the electromagnet 56 is connected in parallel with the stop light 60' and becomes energized responsive to the closure of the stop light switch 61, said stop light switch being operated by the vehicle brake pedal in the usual manner. Thus, one terminal of the electromagnet 56 is grounded and the other terminal of said electromagnet is connected to the ungrounded battery wire 62 of the vehicle through a conductor 63', the stop light switch 61 and another conductor 64. Connected in parallel with the stop light switch 61 is another switch 65 which is operated by the gear shift lever 66 of the vehicle, being arranged to be closed when said lever is placed in reverse gear position. Thus, the electromagnet 56 becomes energized either when the vehicle brakes are applied or when the gear shift lever 66 is placed in reverse gear position.

The electromagnet 23 has one terminal thereof grounded and its other terminal connected by a conductor 70 through a manually operated switch 71 provided on the vehicle dashboard 72 to the ungrounded battery wire 62. Thus, electromagnet 23 may be energized by manually closing switch 71. Connected in parallel with switch 71 is a diaphragm switch 73 of conventional construction which is actuated by the vacuum of the vehicle engine, the switch 73 being normally closed when the engine is inactive but opening responsive to vacuum developed in the intake manifold of the engine. Switch 73, being connected in parallel with switch 71, acts to energize the electromagnet 23 when the engine is stopped.

To adjust the device for operation, it will be assumed that detent element 45 is initially disengaged from the catch plate 63. It will be further assumed that the detent element 45 is in the position thereof shown in Figure 3, wherein the piston 24 is in its outermost position of extension. Thus, when the accelerator pedal 13 is depressed, the rod 11 moves to the right, causing the detent element 45 to lockingly engage with the catch plate, as shown in Figure 3, wherein the top edge of the catch plate 63 engages in the notch 55.

Further movement of the accelerator rod 11 to the right, causes the flange 53 to abut against the washer 56'. The operator then closes switch 71, and depresses the accelerator pedal 13 until a desired speed of the vehicle is obtained. When switch 71 is closed, the electromagnet 23 becomes energized, releasing the rods 27 and 28, as above described, allowing the piston member 24 to be moved inwardly by the force exerted on washer 56'. When the desired speed has been reached, the operator releases the push button of the switch 71, allowing the switch to open, and causing magnet 23 to become deenergized. The spring 36 then acts on the locking bars 32 and 33 to cause said bars to lockingly engage with the rods 27 and 28, locking the piston 25 in a fixed position in the cylinder 21. The accelerator rod 11 will then be held thereafter in the position corresponding to the desired speed as above obtained, because the catch plate 63 continues to be lockingly engaged in the notch 55 of the detent element 45.

If a speed in excess of the adjusted speed is desired, the operator exerts downward force on the accelerator pedal 13, sufficiently to force the rod 45 inwardly in the sleeve 44 against the resistance of the yieldable ball detent 49, as above described. When the foot pressure on the accelerator pedal 13 is released, the spring 46 returns the detent element 45 to its previous position, wherein the accelerator rod 11 is held at the desired position of adjustment, providing the preset speed value.

When the vehicle brakes are applied, the electromagnet 56 becomes energized by the closure of the switch 61, causing its plunger 57 to move arm 59 downwardly and thus causing the catch plate 63 to be retracted downwardly, releasing the detent element 45 and allowing the accelerator rod 11 to return to the left toward its idling position by the biasing action of its own spring means. Thus, the accelerator rod 11 becomes unlocked automatically whenever the brakes are applied. The same action occurs whenever the gear shift lever 66 is placed in reverse position, since this causes closure of the switch 65, as above described.

When the vehicle is parked, the switch 73 closes as soon as the engine is cut off, causing the electromagnet 23 to become energized, whereby the previous speed adjustment is canceled. The same result can be obtained at any time, as desired by the operator by closing the push button switch 71.

As shown in Figure 1, an auxiliary control switch 80 may be provided in the battery wire 62 to deenergize the electromagnet 23 after the vehicle has been parked and the speed adjustment thereof has been canceled, as above described.

The switch 80 may be eliminated by providing a vacuum switch which closes only momentarily when the engine is stopped. Thus, the momentary closing of the vacuum switch will be sufficient to energize the electromagnet 23 and to cancel the previous speed adjustment.

While a specific embodiment of an improved speed-maintaining device for motor vehicles has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a motor vehicle, an accelerator rod, detent means mounted on the vehicle adjacent said accelerator rod, said detent means comprising a slidably movable piston member, a locking member releasably engaging said piston member, and an electromagnet operable plunger being formed and arranged to disengage said locking member from said piston member responsive to energization of said electromagnet, catch means mounted on the accelerator rod and being lockingly engageable with said detent means responsive to the movement of said rod to a predetermined position, and electromagnetic means on the accelerator rod formed and arranged to at times disengage said catch means from the detent means.

2. In a motor vehicle, an accelerator rod, detent means mounted on the vehicle adjacent said accelerator rod, said detent means comprising a slidably movable piston member, a locking member releasably engaging said piston member, and an electromagnet operable plunger being formed and arranged to disengage said locking member from said piston member responsive to energization of said electromagnet, catch means mounted on the accelerator rod, said catch means comprising a movable catch plate, an electromagnet including a plunger, means mechanically connecting said plunger to said catch plate, means biasing said plunger toward a position wherein said catch plate is lockingly engageable with said detent means responsive to the movement of said rod to a predetermined position, and means to at times energize said electromagnet to retract said plunger and disengage said catch plate from the detent means.

3. In a motor vehicle, an accelerator rod, detent means mounted on the vehicle adjacent said accelerator rod, said detent means comprising a housing disposed parallel to said accelerator rod, a piston member slidably mounted in said housing, an external detent element secured axially to said piston member, a locking member pivoted in said housing and engaging said piston member, spring means biasing said locking member into locking engagement with said piston member, an electromagnet in said housing provided with a plunger, means operatively connecting said plunger to said locking member and being formed and arranged to disengage said locking member from said piston member responsive to energization of said electromagnet, catch means mounted on the accelerator rod and being lockingly engageable with said detent element responsive to the movement of said rod to a predetermined position, and electromagnetic means on the accelerator rod formed and arranged to at times disengage said catch means from the detent element.

4. In a motor vehicle, an accelerator rod, detent means mounted on the vehicle adjacent said accelerator rod, said detent means comprising a housing disposed parallel to said accelerator rod, a piston member slidably mounted in said housing, an external detent slidably connected to said piston member in coaxial relation therewith, spring means biasing said detent element outwardly from said piston member, yieldable stop means limiting inward movement of the detent element relative to the piston member, a locking member pivoted in said housing and engaging said piston member, spring means biasing said locking member into locking engagement with said piston member, an electromagnet in said housing provided with a plunger, means operatively connecting said plunger to said locking member and being formed and arranged to disengage said locking member from said piston member responsive to energization of said electromagnet, catch means mounted on the accelerator rod and being lockingly engageable with said detent element responsive to the movement of said rod to a predetermined position, and electromagnetic means on the accelerator rod formed and arranged to at times disengage said catch means from the detent element.

5. In a motor vehicle, an accelerator rod, detent means mounted on the vehicle adjacent said accelerator rod, said detent means comprising a housing disposed parallel to said accelerator rod, a piston member slidably mounted in said housing, an external detent element slidably connected to said piston member in coaxial relation therewith, spring means biasing said detent element outwardly from said piston member, yieldable stop means limiting inward movement of the detent element relative to the piston member, a locking member pivoted in said housing and engaging said piston member, spring means biasing said locking member into locking engagement with said piston member, an electromagnet in said housing provided with a plunger, means operatively connecting said plunger to said locking member and being formed and arranged to disengage said locking member from said piston member responsive to energization of said electromagnet, catch means mounted on the accelerator rod, said catch means comprising a movable catch plate, a second electromagnet including a plunger, means mechanically connecting said last-named plunger to said catch plate, means biasing said last-named plunger toward a position wherein said catch plate is lockingly engageable with said detent element responsive to the movement of said rod to a predetermined position, and means to at times energize said second electromagnet to retract said last-named plunger and disengage said catch plate from the detent element.

References Cited in the file of this patent
UNITED STATES PATENTS

| | | |
|---|---|---|
| 2,236,145 | Kolb | Mar. 25, 1941 |
| 2,322,585 | Ojalvo | June 22, 1943 |
| 2,802,553 | Roggenstein et al. | Aug. 13, 1957 |